(12) United States Patent
Shah et al.

(10) Patent No.: US 9,859,926 B2
(45) Date of Patent: Jan. 2, 2018

(54) SYSTEMS AND METHODS FOR FREQUENCY AND BANDWIDTH OPTIMIZATION WITH A SINGLE-WIRE MULTISWITCH DEVICE

(71) Applicant: THE DIRECTV GROUP, INC., El Segundo, CA (US)

(72) Inventors: Kushan Shah, Torrance, CA (US); Benjamin Mui, Los Angeles, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 0 days.

(21) Appl. No.: 15/270,065

(22) Filed: Sep. 20, 2016

(65) Prior Publication Data

US 2017/0012650 A1 Jan. 12, 2017

Related U.S. Application Data

(62) Division of application No. 14/694,513, filed on Apr. 23, 2015, now Pat. No. 9,461,693.

(51) Int. Cl.
| | |
|---|---|
| *H04H 60/09* | (2008.01) |
| *H04B 1/00* | (2006.01) |
| *H04H 40/90* | (2008.01) |
| *H04L 7/033* | (2006.01) |
| *H04H 20/63* | (2008.01) |

(52) U.S. Cl.
CPC ............ *H04B 1/006* (2013.01); *H04B 1/0071* (2013.01); *H04H 20/63* (2013.01); *H04H 40/90* (2013.01); *H04L 7/033* (2013.01); *Y02B 60/50* (2013.01)

(58) Field of Classification Search
CPC ........ H04B 1/40; H04B 1/3822; H04B 1/406; H04B 1/54; H04B 1/18513; H04B 1/18523; H04H 40/90; H04H 60/27; H04H 60/46; H04N 7/20; H04N 21/435; H04N 21/6143; H04N 7/17318; H04N 21/41407
USPC ........ 455/3.02–3.05, 11.1, 12.1–12.3, 76–78, 455/313, 334
See application file for complete search history.

(56) References Cited

U.S. PATENT DOCUMENTS

| | | | |
|---|---|---|---|
| 798,748 A | 9/1905 | Robinson | |
| 5,574,979 A * | 11/1996 | West ................... | H04B 1/1027 375/356 |

(Continued)

*Primary Examiner* — Nhan Le
(74) *Attorney, Agent, or Firm* — Guntin & Gust, PLC; Robert Gingher

(57) ABSTRACT

This disclosure relates to a devices and methods related to satellite information broadcasting. Example embodiments may include frequency shifting an intermediate frequency (IF) signal down-conversion from the microwave-band. As an example, down-conversion involving local oscillators may lead to frequency drift due to varying temperature and/or humidity conditions. Correcting for the frequency drift may provide an opportunity to remove or filter excess bandwidth. Further embodiments may include receiving, in a tuning request, information about a transponder type. A frequency translation module may be adjusted based, at least in part, on the transponder type related to the IF signal being input into the frequency translation module. Such frequency-shifting and transponder-specific filtering may allow Single-Wire Multiswitch (SWM) devices to provide output signals with narrower bandwidth, which may improve signal quality, cable run length, reduce power demands, etc.

20 Claims, 9 Drawing Sheets

(56) References Cited

U.S. PATENT DOCUMENTS

| | | | |
|---|---|---|---|
| 6,724,804 B1* | 4/2004 | Kegasa | H04B 1/005 |
| | | | 375/130 |
| 7,912,427 B2 | 3/2011 | Santoru et al. | |
| 8,229,383 B2 | 7/2012 | Popoli et al. | |
| 8,238,813 B1 | 8/2012 | Popoli et al. | |
| 8,699,983 B2 | 4/2014 | Xiu et al. | |
| 2008/0081581 A1* | 4/2008 | Rofougaran | H04B 1/18 |
| | | | 455/193.1 |
| 2008/0181291 A1* | 7/2008 | Zhou | H04B 7/1858 |
| | | | 375/227 |

* cited by examiner

SYSTEMS AND METHODS FOR FREQUENCY AND BANDWIDTH OPTIMIZATION WITH A SINGLE-WIRE MULTISWITCH DEVICE

CROSS-REFERENCE TO RELATED APPLICATION(S)

This application is a divisional of and claims priority to U.S. patent application Ser. No. 14/694,513, filed Apr. 23, 2015, which is incorporated herein by reference in its entirety.

BACKGROUND

Satellite broadcasting of information may involve substantial infrastructure to deliver signals to terrestrial client devices. For example, a plurality of ground-based microwave transmitters may transmit information to a plurality of satellites along a communication uplink. The plurality of satellites may be in geostationary orbit in a corresponding plurality of orbital slots. Each satellite may retransmit the information toward ground locations as one or more satellite transponder signals via a radio frequency (RF) communication downlink. An outdoor unit (ODU), usually mounted to a building housing the client device, may receive the one or more satellite transponder signals and convert the carrier frequency of each transponder signal to an intermediate frequency (IF) signal. The client device may send a tuning request to the ODU or an intermediary device, such as a Single-Wire Multiswitch (SWM). The tuning request may include a requested transponder. In response, the IF signal or a particular transponder from the IF signal may be delivered to a client device. Accordingly, a tuner of the client device may then tune to a particular center frequency of the IF signal or the transponder signal in order to properly receive a particular channel.

Down-conversion from RF to an IF signal may introduce frequency instability. That is, due to factors such as temperature and humidity, the intermediate center frequency of the down-converted signal may drift. Furthermore, depending on a transponder type, the transponder signals of interest may have different transmission bandwidths. Thus, in an effort to be compatible with multiple transponder types and to allow for frequency down-conversion drift, a SWM channel of the SWM device may include a default bandwidth that is wider than the transmission bandwidth of the desired transponder signal. The SWM device may be adjusted to attenuate or remove signals outside the transmission bandwidth of the desired transponder. Such adjustments may improve the performance of the SWM device by improving signal to noise, increasing the maximum cable run length, relaxing the requirements for channel output power, etc.

SUMMARY

In a first aspect, a method is provided. The method includes receiving a signal that includes a first carrier frequency. The method also includes combining the signal and a local oscillator tone to produce an intermediate frequency (IF) signal. The IF signal includes an IF signal bandwidth. The IF signal includes at least one transponder signal with a corresponding transponder bandwidth. The method further includes determining, with a processor of a Single-Wire Multiswitch (SWM) device, an intermediate center frequency of the IF signal. The method yet further includes determining, with the processor of the SWM device, a frequency drift based on a comparison between the intermediate center frequency and an expected intermediate center frequency. The method includes frequency shifting the IF signal based on the frequency drift. The method also includes transmitting, from the SWM device, a tuning query via a bi-directional communication link. The SWM device includes at least one frequency translation module configured to provide at least one SWM channel. The method yet further includes receiving, at the SWM device, a tuning request from a client device via the bi-directional communication link. The tuning request includes a requested transponder signal. The method also includes causing a multiswitch of the SWM device to connect the IF signal to the at least one SWM channel based on the tuning request. The method yet further includes causing the at least one frequency translation module to convert the requested transponder signal to the SWM channel. The method additionally includes adjusting a center frequency and a bandwidth of the SMW channel such that the center frequency includes the expected intermediate center frequency and such that the bandwidth is substantially equal to the transponder bandwidth.

In a second aspect, a method is provided. The method includes receiving a signal that includes a first carrier frequency. The method also includes combining the signal and a local oscillator tone to produce an intermediate frequency (IF) signal. The IF signal includes an IF signal bandwidth. The method further includes transmitting, from a Single-Wire Multiswitch (SWM) device, a tuning query via a bi-directional communication link. The SWM device includes at least one frequency translation module configured to provide at least one SWM channel. The method yet further includes receiving, at the SWM device, a tuning request from a client device via the bi-directional communication link. The tuning request includes a requested transponder signal and an expected bandwidth of the requested transponder signal. The method also includes causing a multiswitch of the SWM device to connect the IF signal to the at least one SWM channel based on the tuning request. The method additionally includes causing the at least one frequency translation module to convert the requested transponder signal to the SWM channel. The method further includes adjusting a bandwidth of the at least one SWM channel based on the expected bandwidth of the requested transponder signal. The expected bandwidth of the requested transponder signal is less than the IF signal bandwidth.

In a third aspect, a system is provided. The system includes an antenna, a low-noise block down-converter (LNB), and a Single-Wire Multiswitch (SWM) device. The LNB includes a local oscillator and a frequency mixer. The LNB is configured to receive a signal including a first carrier frequency via the antenna and convert the signal to an intermediate frequency (IF) signal using the frequency mixer by combining the signal and a local oscillator tone. The IF signal includes an IF signal bandwidth. The SWM device is communicatively coupled to the LNB. The SWM device includes a controller and at least one digital signal processor (DSP). The controller of the SWM device is configured to determine, with the at least one DSP, an intermediate center frequency of the IF signal and determine, with the at least one DSP, a frequency drift based on a comparison between the intermediate center frequency and an expected intermediate center frequency. The controller of the SWM device is additionally configured to frequency shift the IF signal based on the frequency drift and allocate a plurality of channel bandwidths to a corresponding plurality of frequency translation modules based at least on the IF signal bandwidth and an operating bandwidth of a client device.

Other aspects, embodiments, and implementations will become apparent to those of ordinary skill in the art by reading the following detailed description, with reference where appropriate to the accompanying drawings.

DETAILED DESCRIPTION

In the following detailed description, reference is made to the accompanying figures, which form a part hereof. It should be understood, however, that the arrangements described herein are set forth as examples only. As such, those skilled in the art will appreciate that other arrangements and elements (e.g., machines, interfaces, functions, orders of functions, etc.) can be used instead or in addition. Further, many of the elements described herein are functional entities that may be implemented as discrete or distributed components or in conjunction with other components, and in any suitable combination and location. Various functions described herein as being performed by one or more entities may be carried out by hardware, firmware or software logic. For instance, various functions described herein may be carried out by a processor executing instructions written in any suitable programming language and stored in memory.

In this description, the articles "a" or "an" are used to introduce elements of the example embodiments. The intent of using those articles is that there is one or more of the elements. The intent of using the conjunction "or" within a described list of at least two terms is to indicate any of the listed terms or any combination of the listed terms. The use of ordinal numbers such as "first," "second," "third" and so on is to distinguish respective elements rather than to denote a particular order of those elements.

I. Overview

Figure 1A:
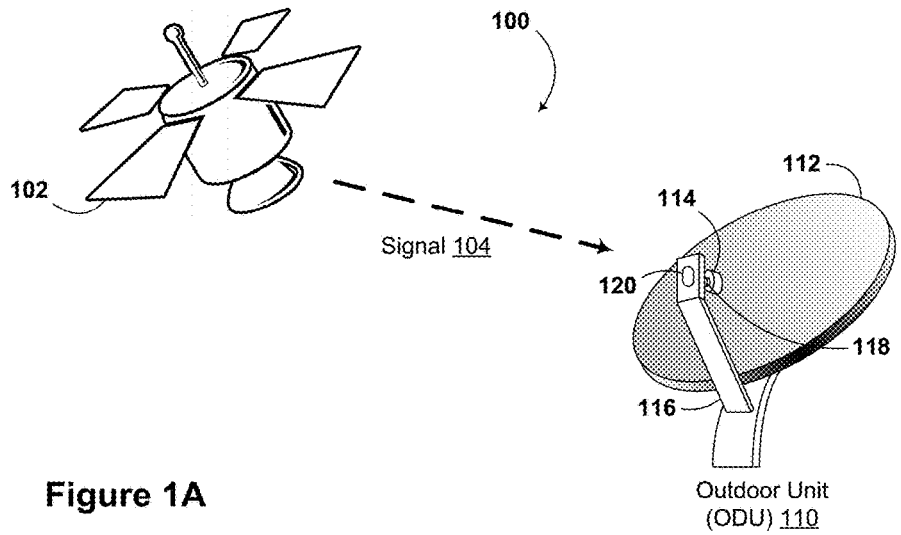
FIG. 1A is a schematic diagram illustrating a system, according to an example embodiment.

FIG. 1A is a schematic diagram illustrating a system 100, according to an embodiment. System 100 may relate to a satellite communication downlink scenario. For example, one or more satellites 102 may transmit a signal 104 in one or more radio frequency (RF) bands, e.g., the microwave Ka-band (26.5-40 GHz) and/or Ku-band (12.4-18 GHz). The signal 104 may additionally or alternatively include other RF bands, e.g. 12.2-12.7 GHz and/or 18.3-20.2 GHz. In a scenario with two or more satellites 102, each satellite 102 may occupy a different geostationary orbital slot.

The signal 104 may be a media signal that may include video or audio signals. The signal 104 may also include a television signal. The content of the signal may vary based on the type of signal. For example, the content may include television programming content, program guide data or other types of data.

In an example embodiment, the signal 104 may include a plurality of video and audio channels transmitted together on a single wideband carrier, which may be associated with a particular transponder signal. The signal 104 may include one or more transponder signals transmitted from a particular satellite 102. The one or more satellites 102 may transmit the signal 104 toward terrestrial locations on the Earth, such as an Outdoor Unit (ODU) 110. The ODU 110 may be mounted on a building and may include an antenna 112, at least one feed horn 114, at least one low-noise block down-converter (LNB) 120, and a support arm 116. The antenna 112, which may include a parabolic dish antenna, may collect and direct the broadcast signals toward the at least one feed horn 114. Each of the feed horns 114 may be associated with at least one LNB 120.

The feed horn 114 may be located proximate to a focus of the antenna 112 and may be coupled to a waveguide 118. The waveguide 118 may be a hollow metal pipe with a rectangular or circular cross-section. Alternatively or additionally, the waveguide 118 may include dielectric materials. The dimensions of the waveguide 118 may be configured so as to efficiently transmit the radio frequency signals along its length. The RF signal in the waveguide 118 and/or feed horn 114 may be coupled to a coaxial cable or another type of electrical connection as an input to the LNB 120.

Figure 1B:
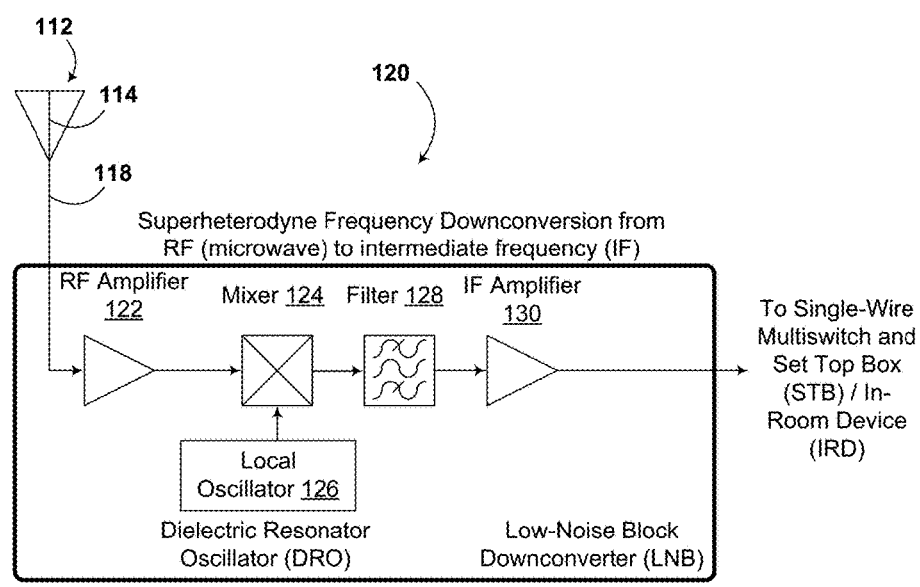
FIG. 1B is a schematic diagram illustrating a low-noise block down-converter, according to an example embodiment.

FIG. 1B is a schematic diagram illustrating an LNB 120, according to an embodiment. The LNB 120 includes an RF amplifier 122, a mixer 124, a local oscillator 126, a filter 128, and, optionally, an intermediate-frequency (IF) amplifier 130. The RF amplifier 122 may be a low-noise amplifier (LNA) operable to amplify the RF signal from waveguide 118 and/or feed horn 114. The mixer 124 may include a circuit configured to mix the output of the RF amplifier 122 with a signal, usually a sine wave, from the local oscillator 126. The local oscillator 126 may include a dielectric resonator oscillator (DRO). The DRO may have a fixed oscillation frequency or a variable oscillation frequency. Other types of local oscillators are contemplated herein, such as a phase-locked loop.

The mixer 124 may be a superheterodyne mixer operable to provide signals based on a sum and a difference of the RF signal and the local oscillator frequency, also known as a beat frequency. In some embodiments, the mixer 124 may include multiple frequency conversion stages, e.g., by mixing the RF signal with multiple local oscillators, etc.

The output of the mixer 124 may be provided as an input to the filter 128. The filter 128 may be configured to attenuate or remove portions of the RF signal and/or the local oscillator signal. The filter 128 may be a digital filter. Accordingly, in this situation, the output of the filter 128 may include an intermediate frequency (IF) signal. For example, the output of filter 128 may include a signal with a frequency range of 950 MHz-1450 MHz (L-Band). Alternatively, the output of filter 128 may span a different frequency range.

The output of filter 128 may be provided to the IF amplifier 130. The IF amplifier 130 may be configured to amplify signals in a predetermined range of frequencies. Frequency down-conversion and the subsequent IF amplification by the LNB 120 may allow the signal to be transmitted via a wire, a coaxial cable, or a fiber optic cable, as opposed to within a hollow metal waveguide.

In an example embodiment, the LNB 120, or portions thereof, may be located proximate to the feed horn 114 so as to minimize the length of the waveguide 118. For instance, the LNB 120 may be provided on the support arm 116. In other embodiments, the LNB 120 may be located elsewhere.

In some embodiments, a plurality of feed horns 114 may be provided. Furthermore, each of the plurality of feed horns 114 may have a corresponding LNB 120. Together, the plurality of feed horn/LNB pairs may be operable to receive signals from multiple satellites in geosynchronous earth orbit. For example, each feed horn/LNB pair may be configured to receive signals from a particular geosynchronous satellites located at a particular angle with respect to the antenna 112. Receiving signals from multiple satellites via a plurality of feed horns 114 and their respective LNBs 120 may enable an increased data rate and/or enable other features, such as high-definition and/or 4K television images.

Figure 2:
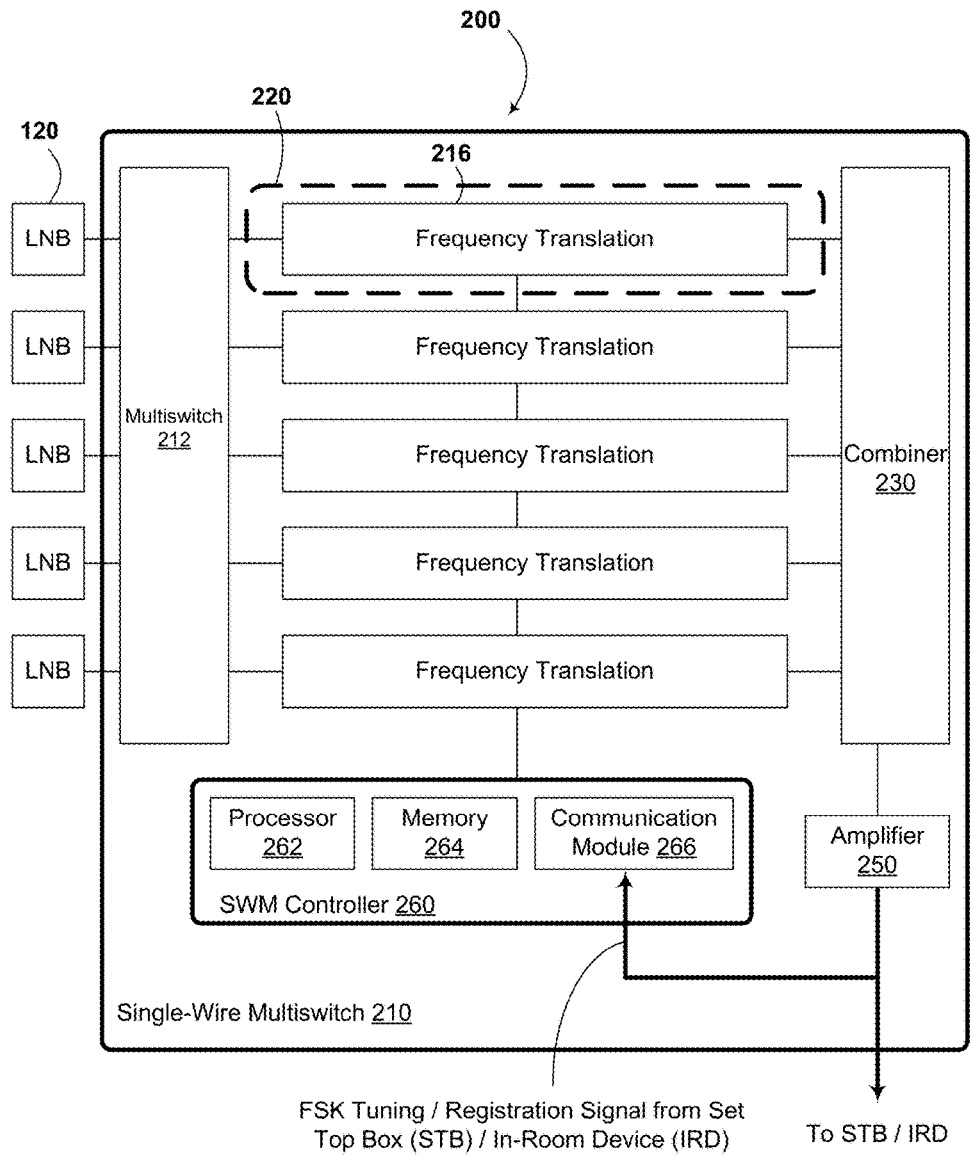
FIG. 2 is a schematic diagram illustrating a system, according to an example embodiment.

FIG. 2 is a schematic diagram illustrating a system 200, according to an embodiment. System 200 may include a Single-Wire Multiswitch (SWM or SWiM) 210. The SWM 210 may include a multiswitch 212, one or more tuning channels 220, one or more frequency translation modules 216, a combiner 230, an amplifier 250, and a SWM controller 260. The one or more frequency translation modules 216 may include respective digital and/or analog signal processing devices. Other types of RF frequency conversion devices are possible.

In some embodiments, the SWM 210 may include thirteen, twenty-three, or more tuning channels 220. Each tuning channel 220 may be operable to transmit an IF signal to an in-room device, as described below.

In an example embodiment, the SWM 210 may include an analog to digital converter (ADC). In such scenarios, some or all of the functions of the SWM 210 may be performed with a digital signal processing (DSP) chip or integrated circuit. That is, the SWM 210 may convert signals from analog to digital and thereafter handle or modify the signals in a digital fashion. Alternatively, some or all of the elements and/or functions of SWM 210 may be performed with analog devices. In an embodiment, the LNBs 120 may be fully or partially incorporated into the SWM 210. Alternatively, the LNBs 120 may be provided separately from the SWM 210.

In an example embodiment, the SWM 210 may receive a plurality of IF signals from respective LNBs 120 as described above in reference to FIGS. 1A and 1B. The plurality of IF signals may relate to one or more frequency-downconverted transponder signals from a plurality of satellites. Each transponder signal may in turn include signals relating to a plurality of broadcast channels. Each transponder signal may have a respective transponder center frequency.

Each tuning channel 220 may be switchably coupled to any of the IF signals from the LNBs 120 via the multiswitch 212. In an example embodiment, each tuning channel 220 may be communicatively coupled to a particular IF signal based on control signals received from the SWM controller 260. The tuning channel 220 may be connected to the particular IF signal via a crossbar switch associated with multiswitch 212. Other ways to communicatively couple a tuning channel 220 to a given IF input are possible.

The frequency translation module 216 may include analog and/or digital signal processing devices configured to adjust bandwidth of tuning channel 220. The frequency translation module 216 may be configured to adjust other aspects of tuning channel 220, such as a center frequency of a signal.

The tuning channels 220 may be combined via combiner 230 and the combined signal may be amplified via amplifier 250. The amplified signal may be transmitted to one or more set top boxes (STB), in-room devices (IRDs), or client devices via a cable and/or one or more wireless communication links.

The SWM controller 260 may include a processor 262, a memory 264, and a communication module 266. The processor 262 may be a microprocessor of a computing device, a microcontroller, a digital signal processor (DSP), multi-core processor, etc. Additionally or alternatively, the processor 262 may include multiple computing devices, such as in a distributed computing network. Processor 262 may be used to coordinate or control tuner 216, demodulator 218, decoder 220, and any other components of system 200 that may or may not be illustrated in FIG. 2.

The memory 264 may include a non-transitory computer-readable medium, for example, such as computer-readable media that stores data for short periods of time like solid-state memory, flash drives, register memory, processor cache, and Random Access Memory (RAM). The computer-readable medium may also or alternatively include non-transitory media, such as secondary or persistent long-term storage, like read only memory (ROM), optical or magnetic disks, compact disc read-only memory (CD-ROM), for example. The computer-readable medium may also be any other volatile or non-volatile storage system. The computer-readable medium may, for example, be considered a computer-readable storage medium, a tangible storage device, and/or memory distributed within a computing network.

Additionally or alternatively, memory 264 may include removable storage devices, non-removable storage devices, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), memory cards, smart cards and tape drives to name a few. Computer storage media can include volatile and nonvolatile, transitory, non-transitory, removable and non-removable media implemented in any method or technology for storage of information, such as computer-readable instructions, data structures, program modules, or other data.

The communication module 266 may be configured to receive commands from an IRD via a wired or wireless communication link. In an example embodiment, the communication module 266 may be operable to receive and transmit frequency-shift keyed (FSK) messages via the wired or wireless communication link. For example, the FSK messages may be transmitted and received via the same cable as that providing the amplified and modulated transponder signals to the IRD. In an embodiment, digital signals may be transmitted and received by the communication module 266 and the IRD according to a binary FSK (BFSK) protocol. In such a scenario, the communication link may be bi-directional and may include signals having a center frequency of 2.3 MHz. Other center frequencies are possible for the communication link.

The SWM controller 260 may control several aspects of the SWM 210. For example, as described above, the SWM controller 260 may be operable to control the multiswitch 212 to communicatively couple various IF inputs/transponder channels to each tuning channel 220 of the SWM 210. In such a scenario, the SWM controller 260 may receive a request from a particular IRD via the communication module 266. The request from the particular IRD may include a tuning request for one or more particular transponder channels. In response, the SWM controller 260 may cause the multiswitch 212 to communicatively couple the corresponding tuning channels 220 to the particular IF signals in an effort to provide the requested transponder channels to the particular IRD according to the tuning request.

Figure 3:
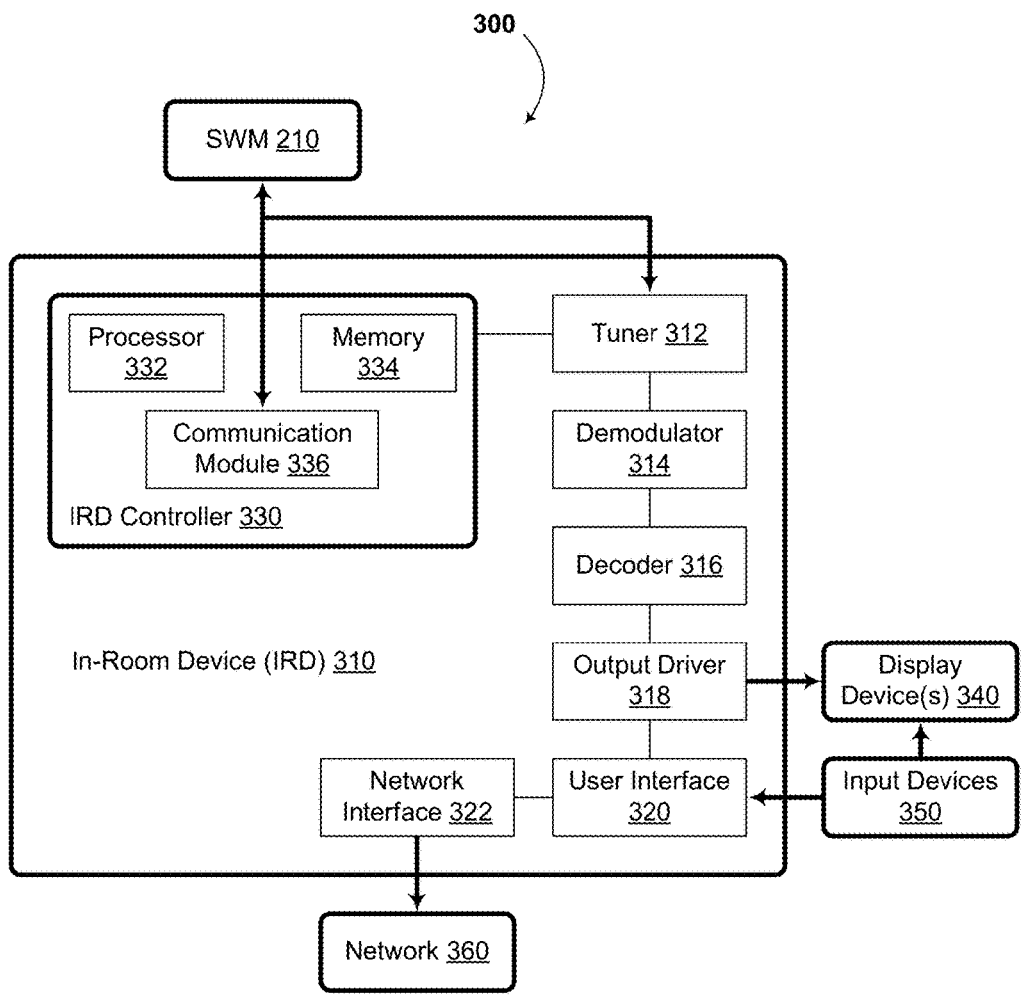
FIG. 3 is a schematic diagram illustrating a system, according to an example embodiment.

FIG. 3 is a schematic diagram illustrating a system 300, according to an embodiment. System 300 may include an In-Room Device (IRD) 310. The IRD 310 may be used for television or other media. As another example, IRD 310 may include or be arranged as a landline or cellular telephone, smartphone, personal computer, laptop computer, tablet computer, personal digital assistant (PDA), portable media player, set-top box, a television or component of a television, or other computing device now known or later developed.

The IRD 310 may receive signals via a wired or wireless communication link from the SWM 210, as illustrated and described in reference to FIG. 2. The IRD 310 may handle some or all signals from SWM 210 digitally. As such, the IRD 310 may include an ADC and/or a DAC. Furthermore, some or all elements of IRD 310 may be included in a DSP chip, although analog embodiments are also contemplated herein.

The IRD 310 may include at least one tuner 312, at least one demodulator 314, at least one decoder 316, and at least one output driver 318. Although, a particular configuration of system 300 is illustrated, the configuration is merely representative of various possible embodiments. For example, although only one tuner 312, one demodulator 314, and one decoder 316 are illustrated, multiple tuners, demodulators, or decoders may be provided within system 300. The components described in reference to FIG. 3 may be communicatively linked by a system bus, a network, or another connection.

The display device 340 may include a television, a monitor, or another device configured to display images. The images may be video, graphics, text, or any variety of other visual representations. In some examples, the display device 340 may include an audio output, such as a loudspeaker, to generate sound waves from media signals received by the display device 340.

Display device 340 may communicate with the output driver 318 to facilitate communication between IRD 310 and display device 340. In some implementations, output driver 318 may work in conjunction with a graphics processing unit (not illustrated), which can be configured to communicate with display device 340. Output driver 318 can communicate with display device 340 by a high-definition multiple interface (HDMI) cable, a coaxial cable, some other wired communication link, or wirelessly.

The IRD 310 may additionally include a network interface 322 and an IRD controller 330. One or more input devices 350 may communicate with the IRD 310 via a user interface 320. The input devices 350 may include a remote control, a keyboard, a mouse, a trackball, a smartphone, a smartwatch, a tablet, a personal computer, a voice-activated interface or another type of computing device. The input devices 350 may additionally include hardware and software configured to provide gesture recognition. The input devices 350 may be operable to directly or indirectly control the IRD 310, the SWM 210, the LNB 120, and/or other systems described herein. For example, a channel guide may be provided to a user via the user interface 320 and display device 340. In such a scenario, the user may use the input device 350 to select a requested channel.

In an example embodiment, the input device 350 may send a message to the IRD 310 via the user interface 320 and/or the communication module 336. The message may include a requested channel. In response to receiving a message with the requested channel, the IRD controller 330 may adjust one or more tuners 312 to provide the requested channel via the display device 340. Additionally or alternatively, the IRD controller 330 may transmit a tuning request to the SWM 210 via the communication module 336 according to the FSK protocol described above. Accordingly, in such a situation, the SWM controller 260 may adjust the multiswitch 212 and/or one or more tuning channels 220 so as to provide the IRD 310 with a transponder signal corresponding to the requested channel.

The one or more input device 350 may also control one or more of the display devices 340. For instance, the input device 350 may be a universal remote configured to control various functions of the display devices 340 and other peripherals, e.g., CD/DVD/BD player, audio/video receiver, a media library, etc.

The network interface 322 may be operable to communicatively connect with a network 260. The network interface 322 may be a WiFi, WiMax, WiMax mobile, data over cable service interface specification (DOCSIS), wireless, cellular, or other types of interfaces. Moreover, network interface 322 may use a variety of protocols for communicating via the network 260. For instance, network interface 322 may communicate using Ethernet, a Transmission Control Protocol/Internet Protocol (TCP/IP), a hypertext transfer protocol (HTTP), or some other protocol.

The IRD controller 330 may include a processor 332, a memory 334, and a communication module 336. Similar to the SWM controller 260, the IRD controller 330 may be a computing device with one or more processors 332. The IRD controller 320 may be configured to control various aspects of the IRD 310. For example, the IRD controller 320 may cause the tuner 312 to tune a signal from the SWM 210 in an effort to provide a previously requested channel via the display devices 340.

II. Example Systems

Example systems described herein may relate to any or all of system 100, system 200, and/or system 300 illustrated and described in reference to FIGS. 1A-B, 2, and 3. Changing temperature and humidity conditions may cause the process of frequency down-conversion to vary over time. That is, the down-converted center frequency of a given IF signal and/or transponder signal may drift. Generally, this frequency drift has been handled by providing the signal with some excess bandwidth. However, using frequency shifting to compensate for the frequency drift may remove the need to provide excess bandwidth.

Excess bandwidth has also been previously allocated to handle different types of transponder signals. For instance, a Ka-band-type transponder may transmit a transponder signal with a bandwidth of 36 MHz while a Ku-band-type transponder may transmit a transponder signal with a 24 MHz bandwidth. Previously, tuning channel bandwidths had been set at least at 36 MHz to accommodate both types of transponder signals. However, by initially receiving the type of transponder signal to be provided by a given tuning channel, the SWM device may be able to reduce excess bandwidth in some cases, such as when a Ku-band-type transponder signal is provided by the given tuning channel.

Thus, embodiments described herein may enable a SWM device to reduce excess bandwidth associated with a given transponder signal. Accordingly, a desired transponder signal may be provided over longer cable runs, with a higher signal to noise ratio, and/or with greater power over the actual transponder signal bandwidth.

Figure 4:
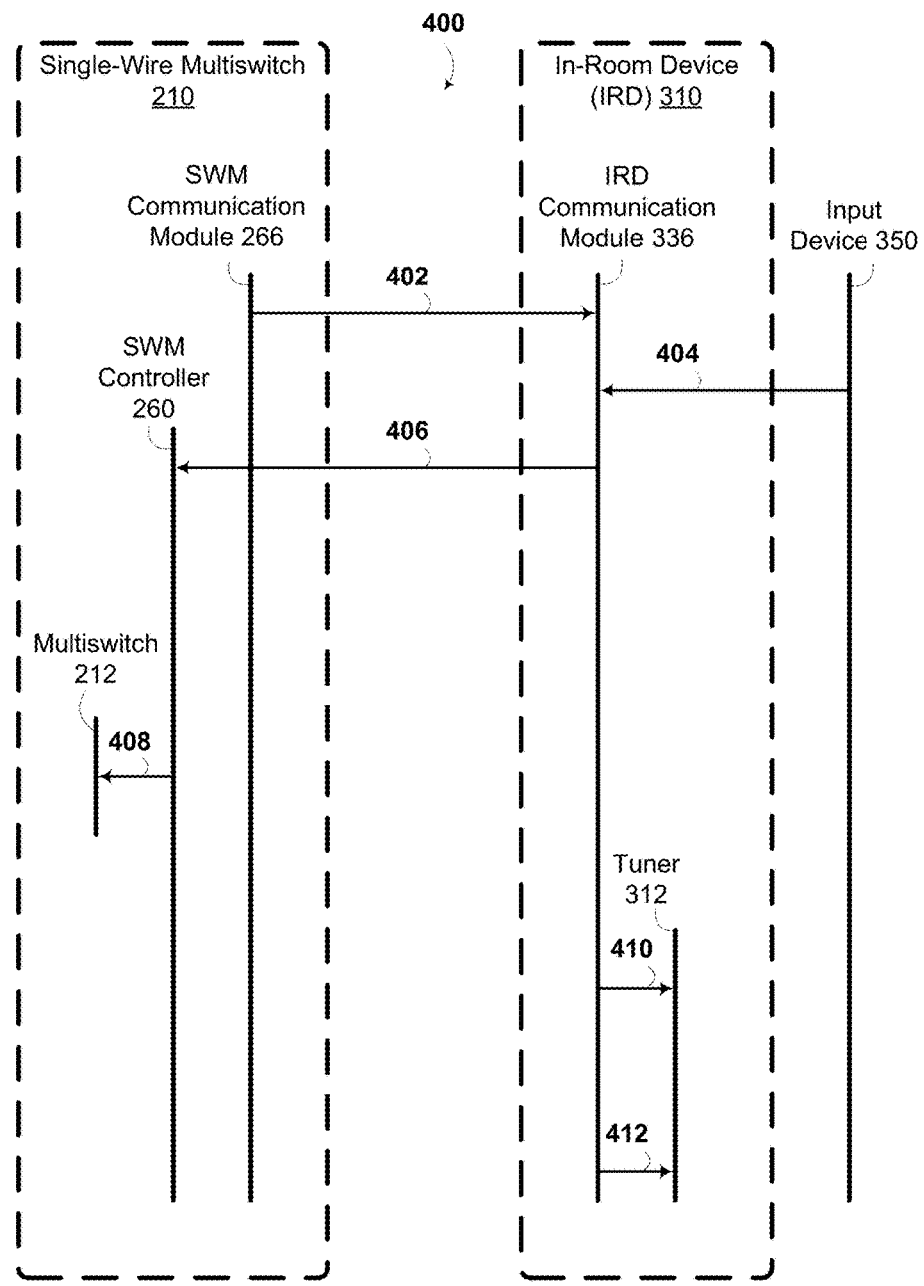
FIG. 4 is a schematic diagram illustrating message communications, according to an example embodiment.

FIG. 4 is a schematic diagram 400 illustrating messaging communications, according to an embodiment. As illustrated in diagram 400, the communication module 266 of the SWM controller 260 may be configured to communicate with one or more client devices via a bi-directional communication link. The bi-directional communication link could be a wired or wireless communication link. For instance, the bi-directional communication link may include message transfer according to an FSK protocol.

In an example embodiment, the communication module 266 of SWM controller 260 may transmit a tuning query 402 as a FSK message via the bi-directional communication link. The SWM controller 260 and/or the SWM communication module 266 may send out such tuning queries 402 via a polling process. That is, the SWM controller 260 may poll one or more registered client devices for new tuning requests or other information. For instance, the SWM controller 260 may access a registration list that includes at least one previously-registered client device. As such, the SWM controller 260 may transmit one tuning query for each previously-registered client device.

In response to the tuning query 402, a client device may attempt to send a tuning request to the SWM 210. In an example embodiment, the one or more previously-registered IRDs 310 may respond by sending a tuning request 406. The tuning request 406 may include a requested transponder signal. For example, a user may have requested a particular channel from a channel guide or by entering the channel via an input device 350 of a requesting IRD, as illustrated by channel request 404. The requesting IRD, which may be IRD 310, may access a channel look-up table that relates specific channels to one or more transponder signals. Accordingly, the communication module 336 of the IRD controller 330 may transmit a tuning request 406 with the corresponding requested transponder to the SWM 210.

In response to receiving the tuning request 406, the SWM controller 260 may be configured to cause the multiswitch 212 to connect at least one of the IF inputs from LNB 120 to at least one previously assigned tuning channel 220 based on the tuning request 406. For example, SWM controller 260 may receive a requested transponder as included in tuning request 406. The SWM controller 260 may send switching command 408, which may cause the multiswitch 212 to connect at least one of the IF inputs corresponding to the requested transponder to at least one of the previously assigned tuning channels 220. The SWM controller 260 may perform other functions, such as adjusting a channel bandwidth and/or a channel center frequency via the frequency translation module 216.

The IRD 310 may send a tuning command 410 to the one or more tuners 312, which may cause the tuners 312 to tune to the requested transponder. Additionally, the IRD 310 may send a filter command 412 to the one or more filters 312.

Figure 5A:
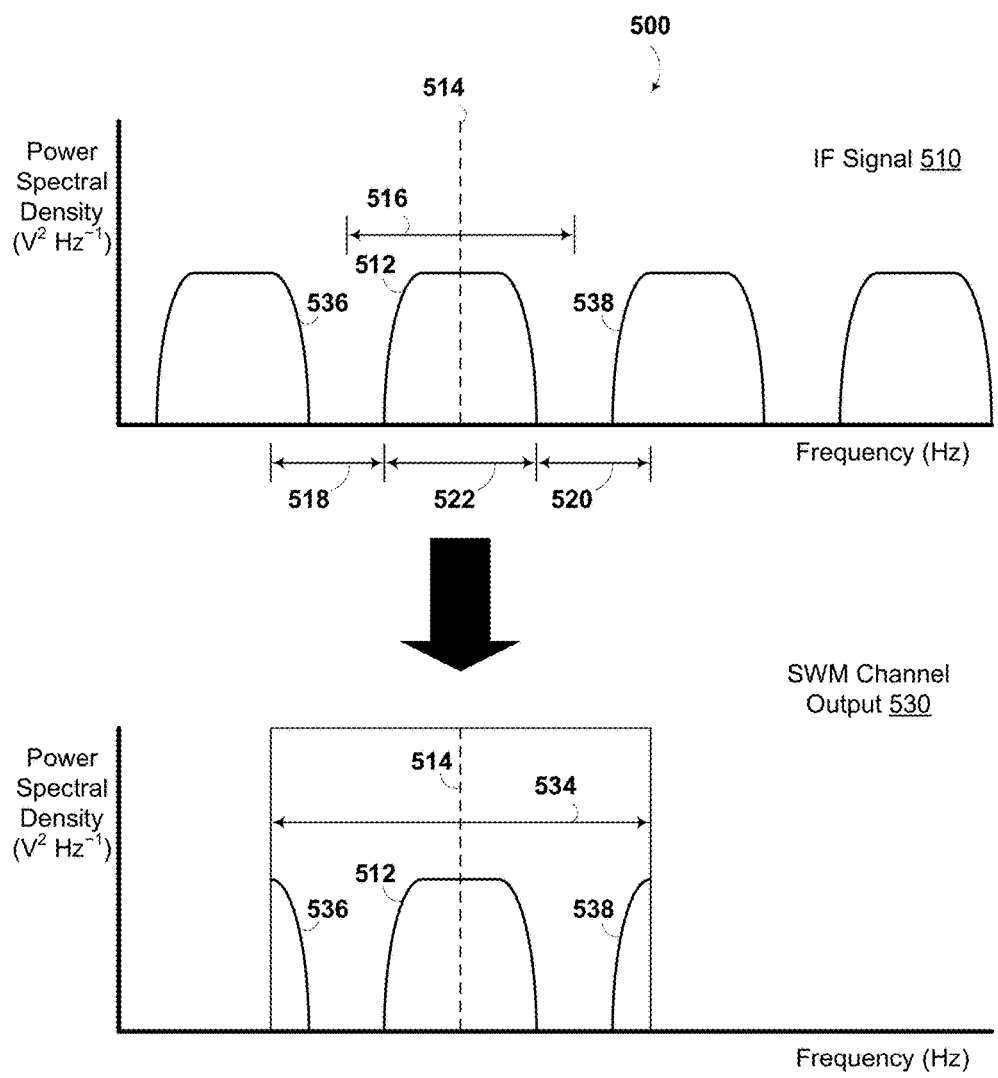
FIG. 5A is a schematic diagram illustrating power spectral density waveforms, according to an example embodiment.
Figure 5B:
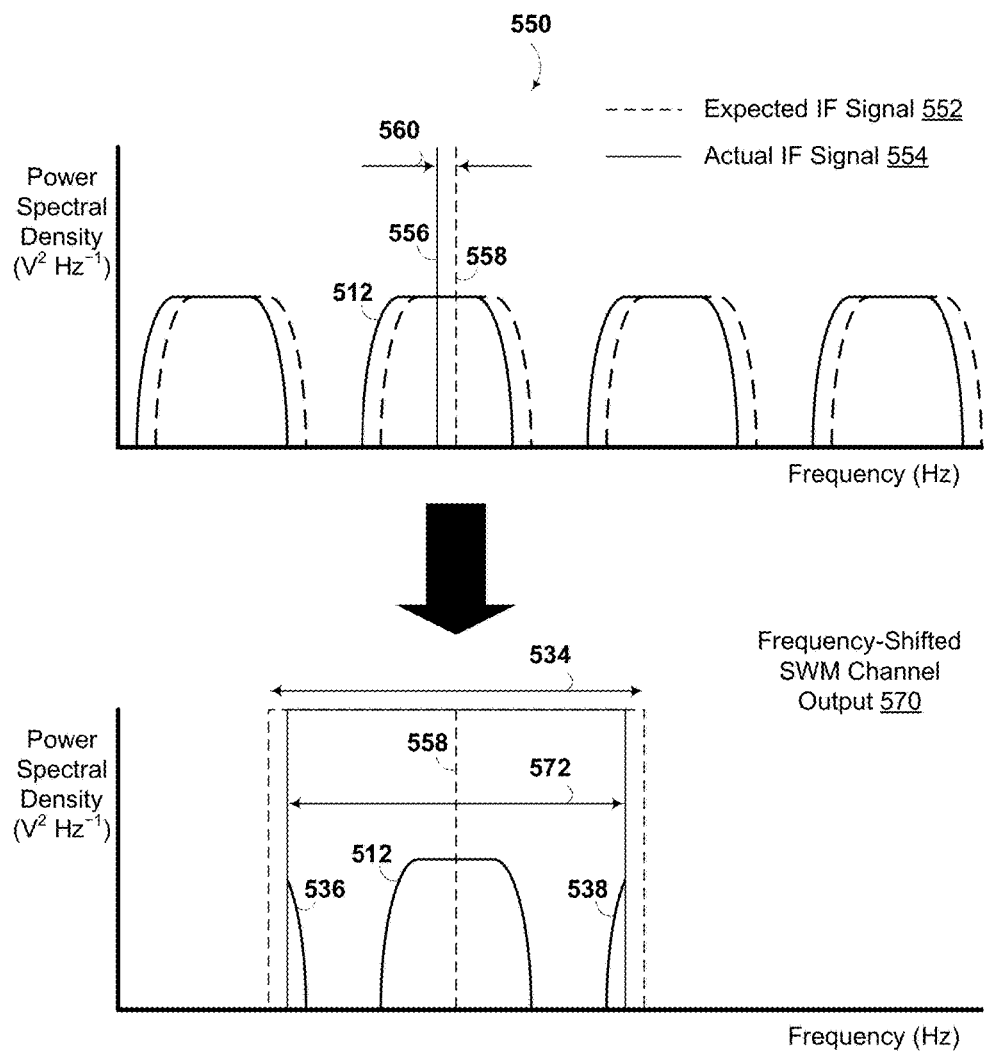
FIG. 5B is a schematic diagram illustrating power spectral density waveforms, according to an example embodiment.
Figure 5C:
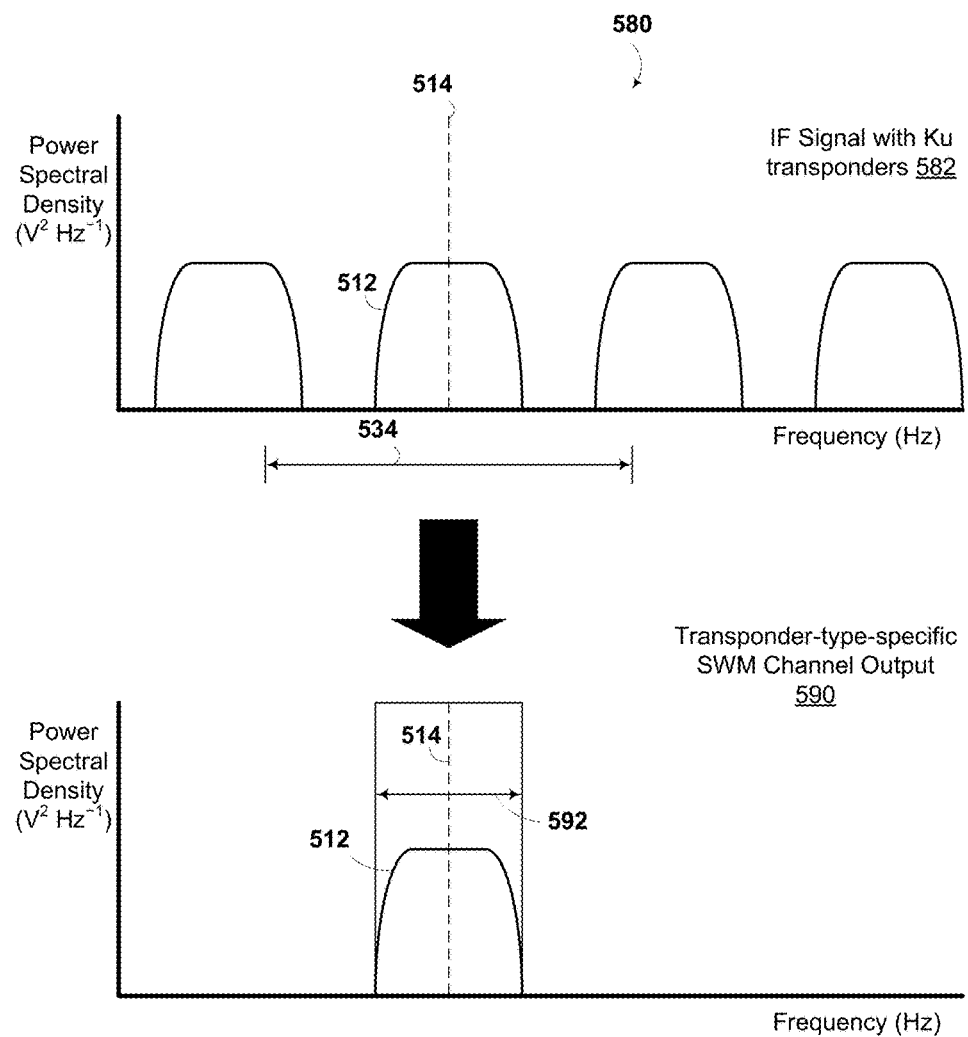
FIG. 5C is a schematic diagram illustrating power spectral density waveforms, according to an example embodiment.

FIGS. 5A, 5B, and 5C are schematic diagrams that illustrate power spectral density waveforms 500, 550, and 580, according to example embodiments. FIGS. 5A, 5B, and 5C may illustrate ways in which excess bandwidth may be determined and removed with filters and/or digital signal processing.

In some embodiments, an IF signal 510 may be visualized in terms of a power spectral density waveform 500. Namely, the IF signal 510 may include a plurality of transponders that may each correspond to a frequency waveband. For instance, a user may request, via tuning request, a desired transponder signal 512. The desired transponder signal 512 may have an actual transponder bandwidth 522 and a desired transponder center frequency 514. Furthermore, the IF signal 510 may include other transponder signals, such as adjacent transponder signals 536 and 538, which may in adjacent frequency bands to desired transponder signal 512.

In order to provide the desired transponder signal 512 to the user, the SWM tuning channel output 530 may include an output bandwidth 534 that may include the desired transponder signal 512 as well as at least a portion of the adjacent transponder signals 536 and 538. The SWM tuning channel output 530 may be centered on the transponder center frequency 514. The output bandwidth 534 may be substantially greater than the actual transponder bandwidth 522 due to excess bandwidth 518 and 520. Excess bandwidth 518 and 520 may be included in the SWM tuning channel output 530 for a number of reasons described below. However, excess bandwidth 518 and 520 in the SWM tuning channel output 530 may act to decrease signal to noise ratio, limit cable run lengths, and require greater signal amplification.

Due to various factors such as humidity and temperature, the down-converted IF signal may undergo frequency drift. Namely, the center frequency of the IF signal may vary based on, for example, a phase deviation between a resonant portion and an active portion of the frequency mixer circuit. In some cases, the frequency drift may be introduced by instabilities with the resonant frequency and/or phase of the local oscillator, e.g., a dielectric resonant oscillator or a phase-locked loop.

In order to compensate for such frequency instability, some SWM devices may add excess bandwidth 518 and 520 to ensure the desired transponder signal 512 is completely within the output bandwidth 534, as shown in FIG. 5A.

In some embodiments, the SWM controller 260 may send an initial tuning command that may include an expected intermediate center frequency 558. In response, an IF signal with the expected intermediate center frequency 558 may be switched to a tuning channel 220 via multiswitch 212, as shown in FIG. 5B. The expected intermediate center frequency 558 may be determined based on an intermediate center frequency look-up table. The intermediate center frequency look-up table may include at least one entry that includes the expected intermediate center frequency 558. The look-up table may be stored at the SWM 210 or elsewhere. Alternatively, the SWM 210 may receive the expected intermediate center frequency 558 from the IRD 310 or from another source.

Due to the aforementioned frequency drift, the actual IF signal 554, and correspondingly actual intermediate center frequency 556, may be shifted in frequency from the expected IF signal 552.

In such a scenario, the SWM controller 260 may be configured to determine, with a digital signal processor, the actual intermediate center frequency 556 of the actual IF signal 554. The determination may be made using various known digital signal processing techniques, such as by taking a Fourier transform of the signal to produce one or more power spectral density waveforms, such as waveforms 550. In such a scenario, the actual intermediate center frequency 556 may be determined based on one or more peaks or midpoints of the actual IF signal 554 and/or the desired transponder signal 512.

Furthermore, the SWM controller 260 may determine a frequency drift 560 based on a comparison between the actual intermediate center frequency 556 and the expected intermediate center frequency 558. For example, the comparison may return a frequency difference between actual intermediate center frequency 556 and the expected intermediate center frequency 558.

The SWM controller 260 may use the frequency translation module 216 to frequency-shift the actual IF signal 554 based on the frequency drift 560. By correcting the frequency drift 560, a frequency-shifted SWM tuning channel output 570 may have a narrower output bandwidth 572 than the output bandwidth 534 without frequency shifting. Thereafter, the SWM controller 260 may allocate a plurality of channel bandwidths to a corresponding plurality of tuning channels based, for example, on the narrower output bandwidth 572 and an operating bandwidth of a client device. The operating bandwidth of the client device may include the total bandwidth over which the tuners of the client device may be tuned.

FIG. 5C is a schematic diagram illustrating power spectral density waveforms 580, according to an example embodiment. An IF signal with Ku transponders 582 may include a desired transponder signal 512, which may have a desired transponder center frequency 514. In some cases, an output bandwidth 534 may be larger than the actual desired transponder bandwidth. For example, in the case of a Ku-type transponder signal, the actual transponder bandwidth may be about 24 MHz. However, in order to accommodate Ka-type transponder signals, the output bandwidth 534 may be about 46 MHz or more. Thus, substantial excess bandwidth may be included within the output of the SWM channel.

Embodiments herein may include adjusting the output bandwidth of a tuning channel based on the type of transponder corresponding to the requested transponder signal. For example, the SWM controller 260 may be configured to transmit a tuning query via the bi-directional communication link as described in reference to FIG. 4. Further, the SWM controller 260 may be configured to receive a tuning request from a client device via the bi-directional communication link. The tuning request may include a requested transponder signal and an expected bandwidth of the requested transponder signal. That is, the tuning request may include information about the type of transponder signal that has been requested.

The SWM controller 260 may cause an IF signal to be communicatively coupled to a tuning channel 220. The IF signal may include a center frequency of the requested transponder signal. Furthermore, the SWM controller 260 may adjust a frequency translation module 216 associated with the tuning channel 220. The adjustment of the frequency translation module 216 may be based on the expected bandwidth of the requested transponder signal. For example, the expected bandwidth of the requested transponder signal may be less than the IF signal bandwidth. Accordingly, the adjustment of frequency translation module 216 may include filtering as much excess bandwidth as possible. Thus, the transponder-type-specific SWM filtered channel output 590 may have a filtered output bandwidth 592 identical or substantially similar to the expected bandwidth of the requested transponder, with very little or no excess bandwidth. By reducing excess bandwidth, example embodiments described herein may additionally or alternatively enable tighter packing of SWM channels within a given amount of bandwidth.

III. Example Methods

Figure 6:
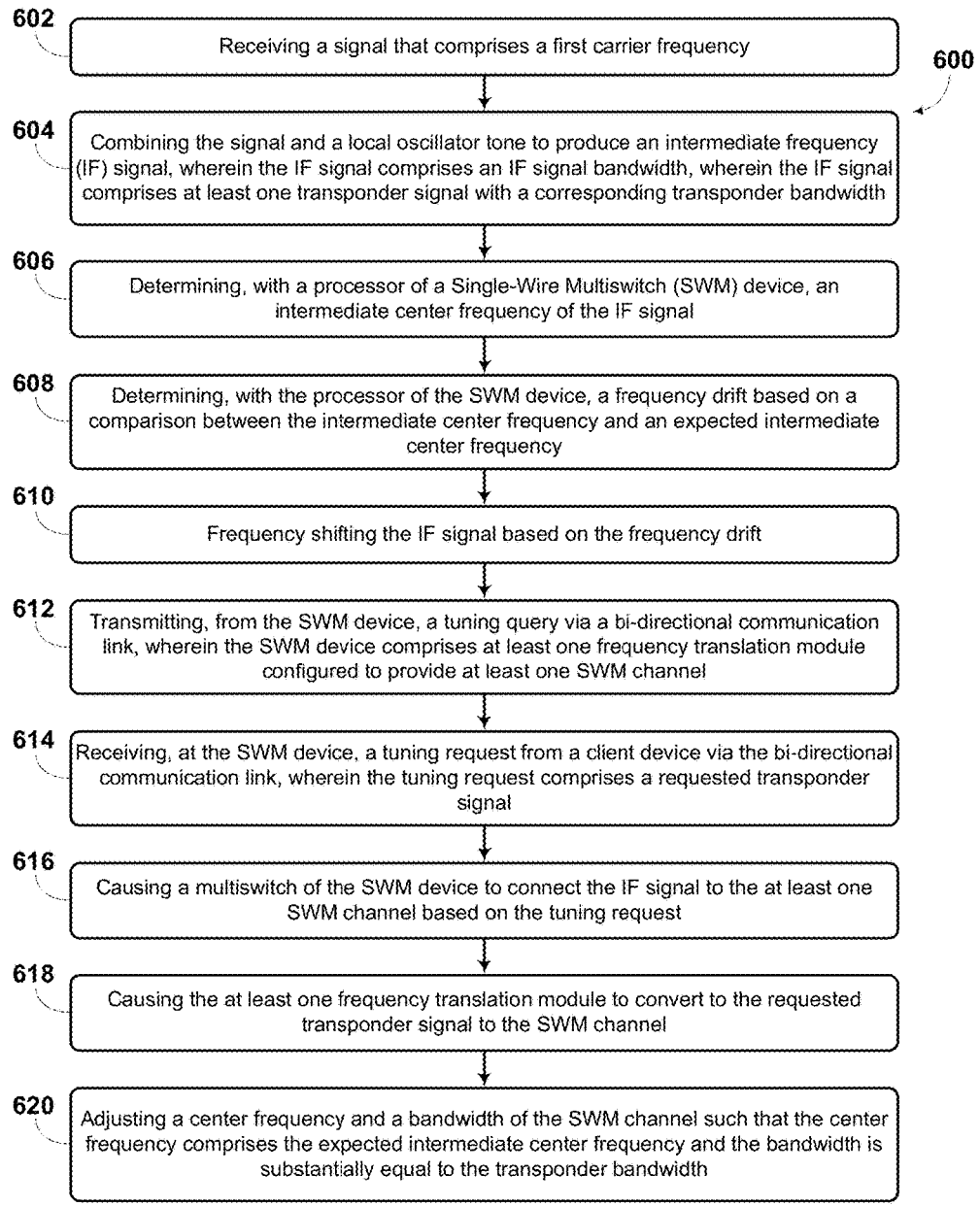
FIG. 6 illustrates a method, according to an example embodiment.
Figure 7:
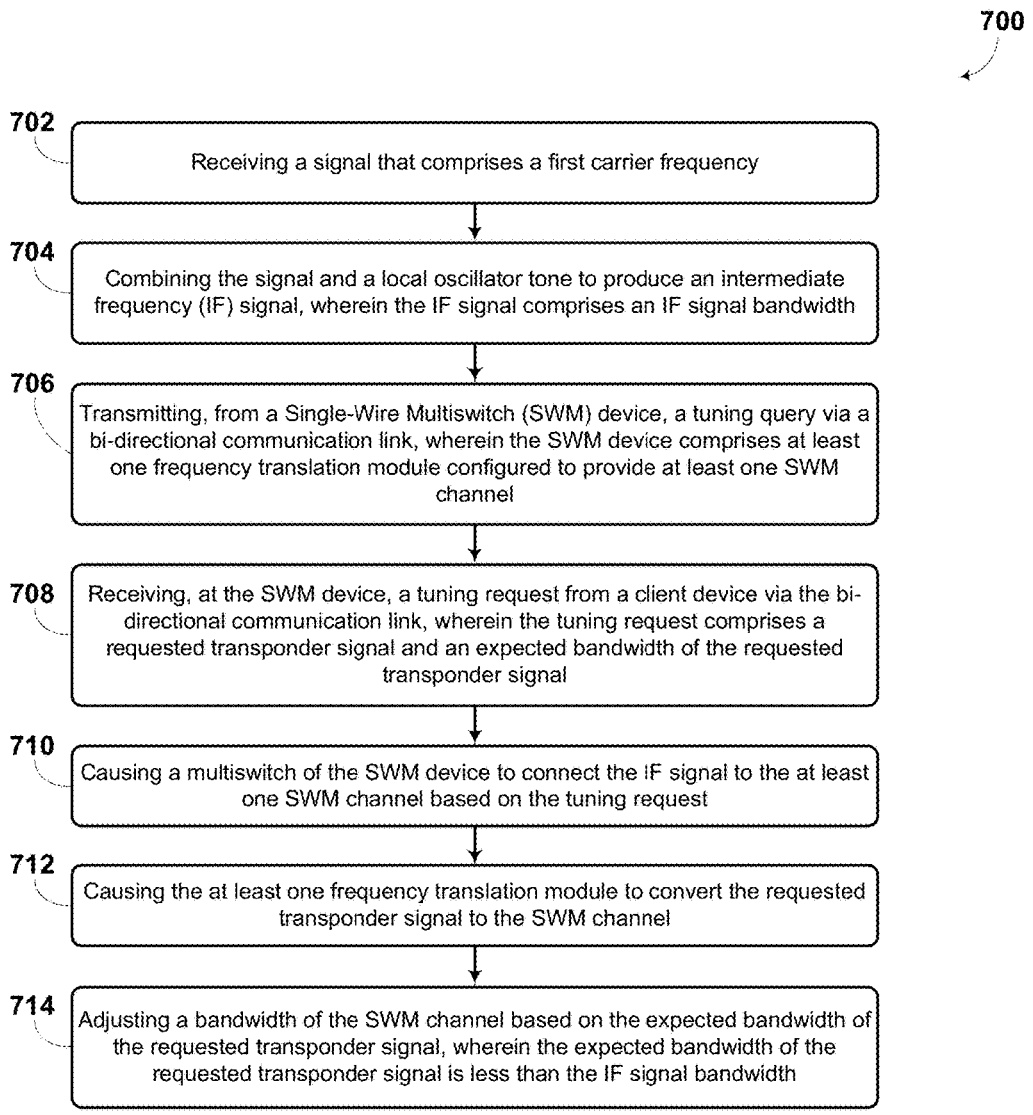
FIG. 7 illustrates a method, according to an example embodiment.

FIG. 6 and FIG. 7 illustrate method 600 and method 700, respectively, according to example embodiments. Method 600 and method 700 may include various blocks or steps. The blocks or steps may be carried out individually or in combination. The blocks or steps may be carried out in any order and/or in series or in parallel. Further, blocks or steps may be omitted or added to method 600 and method 700.

The blocks of method 600 and/or method 700 may be carried out by system 200 as illustrated and described in reference to FIG. 2, however other elements may be used to carry out the methods, such as those in system 100 and system 300 from FIGS. 1 and 3. Furthermore, blocks of method 600 and/or method 700 may be carried out, at least in part, by utilizing the messaging communications as illustrated and described in reference to FIG. 4. Additionally, example embodiments may include power spectral density waveforms similar or identical to those illustrated and described in reference to FIGS. 5A, 5B, and 5C.

As illustrated in FIG. 6, block 602 includes receiving a signal that includes a first carrier frequency. The signal may be signal 104 as illustrated and described in FIG. 1A. That is, the signal may be a microwave-band signal transmitted from a geostationary satellite. The signal may include one or more transponder signals. The transponder signal(s) may include information, media, television programming, etc.

Block 604 includes combining the signal and a local oscillator tone to produce an intermediate frequency (IF) signal. The IF signal includes an IF signal bandwidth. The IF signal may be provided by an LNB, such as LNB 120 as illustrated and described in reference to FIG. 1A and FIG. 1B. However, other ways to down-convert a microwave-band signal are contemplated. The IF signal may include at least one transponder signal, each of which may, in turn, include a corresponding transponder bandwidth Block 606 includes determining, with a processor of a Single-Wire Multiswitch (SWM) device, an intermediate center frequency of the IF signal. The SWM device may be an all-digital device. Alternatively, at least a portion of the SWM device may handle signals in an analog fashion. The SWM device may be SWM 210, however other types of SWM devices are contemplated herein.

Block 608 includes determining, with the processor of the SWM device, a frequency drift based on a comparison between the intermediate center frequency and an expected intermediate center frequency. That is, as described above, frequency drift may occur in conjunction with frequency down-conversion, for example, due to variable temperature or humidity conditions. The SWM device may be configured to determine the frequency drift by comparing the expected intermediate center frequency (which may be known a priori) and the actual intermediate center frequency.

The expected intermediate center frequency may be known to the SWM device through a look-up table. For example, the look-up table may include at least one entry that includes the expected intermediate center frequency. Alternatively, the expected intermediate center frequency may be provided via the bi-directional communication link. For example, the client device (IRD) or another device may transmit the expected intermediate carrier to the SWM device. Other ways of obtaining the expected intermediate carrier are possible.

The determination of the actual intermediate center frequency of the IF signal may include finding a peak position of a power spectral density waveform of the IF signal. In other words, the intermediate center frequency may be approximated by finding the frequency of the peak of IF signal energy. In some embodiments, the power spectral density of the IF signal may be produced from a Fourier transform of the IF signal. Other ways to determine the actual intermediate center frequency are possible.

Block 610 includes frequency shifting the IF signal based on the frequency drift. In some embodiments, the SWM device may initially tune to the expected intermediate center frequency. Subsequently, frequency shifting the IF signal may include using a digital signal processor to tune from the expected intermediate center frequency to the actual intermediate center frequency.

Block 612 includes transmitting, from the SWM device, a tuning query via a bi-directional communication link. The SWM device includes at least one tuner and at least one filter configured to provide at least one tuning channel.

Block 614 includes receiving, at the SWM device, a tuning request from a client device via the bi-directional communication link. The tuning request includes a requested transponder signal.

Block 616 includes causing a multiswitch of the SWM device to connect the IF signal to the at least one tuning channel based on the tuning request.

Block 618 includes causing the at least one tuner of the at least one tuning channel to tune to the requested transponder signal.

Block 620 includes adjusting a center filter frequency and a filter bandwidth of a frequency translation module. The center filter frequency may be adjusted such that the center filter frequency equals the expected intermediate center frequency. The filter bandwidth may be adjusted such that the filter bandwidth is substantially equal to the transponder bandwidth.

In some embodiments, the filter bandwidth may be a default transponder bandwidth, such as 46 MHz, minus either a) the determined frequency drift or b) twice the determined frequency drift. Alternatively, the filter bandwidth may be another quantity. For example, the filter bandwidth of the at least one filter may be between 34 MHz and 38 MHz.

With respect to FIG. 7, block 702 includes receiving a signal that includes a first carrier frequency.

Block 704 includes combining the signal and a local oscillator tone to produce an intermediate frequency (IF) signal. The IF signal includes an IF signal bandwidth.

Block 706 includes transmitting, from a Single-Wire Multiswitch (SWM) device, a tuning query via a bi-directional communication link. The SWM device includes at least one tuner and at least one filter configured to provide at least one tuning channel.

Block 708 includes receiving, at the SWM device, a tuning request from a client device via the bi-directional communication link. The tuning request includes a requested transponder signal and an expected bandwidth of the requested transponder signal. In some embodiments, the client device may include a look-up table. The look-up table may include, for instance, at least one entry that includes the requested transponder signal and the expected bandwidth of the requested transponder signal.

As described herein, the requested transponder signals may include at least a Ka-band transponder (36 MHz transponder bandwidth) and a Ku-band transponder (24 MHz transponder bandwidth). Other types of transponders and corresponding bandwidths are possible.

Block 710 includes causing a multiswitch of the SWM device to connect the IF signal to the at least one tuning channel based on the tuning request.

Block 714 includes adjusting a filter bandwidth of a frequency translation module based on the expected bandwidth of the requested transponder signal. The expected bandwidth of the requested transponder signal is less than the IF signal bandwidth. The frequency translation module may subsequently filter the IF signal based on the adjusted filter bandwidth. As an example, in the case of a requested transponder signal that corresponds to a Ku-band-type transponder, the filtering may form a tuning channel output with a 25 MHz bandwidth as compared to the default 46+ MHz bandwidth. In some cases, a reduction in output bandwidth from the SWM device may offer longer cable runs, increased power on the actual desired transponder signal, and better signal quality. Alternatively or additionally, example embodiments described herein may enable more SWM channels within a given amount of tuner bandwidth at least because frequency correction and/or filtering may allow SWM channels to be more tightly packed.

IV. Conclusion

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. A system comprising:
   a low-noise block down-converter (LNB) comprising a local oscillator and a frequency mixer, wherein the LNB, responsive to receiving a signal comprising a first carrier frequency, converts the signal to an intermediate frequency (IF) signal using the frequency mixer by combining the signal and a local oscillator tone, wherein the IF signal comprises an IF signal bandwidth; and
   a single-wire multiswitch (SWM) device communicatively coupled to the LNB, wherein the SWM device comprises:
      a processing system including a controller and a digital signal processor (DSP); and
      a memory that stores executable instructions that, when executed by the processing system, facilitate performance of operations comprising:
         determining an intermediate center frequency of the IF signal;
         determining a frequency drift based on a comparison between the intermediate center frequency and an expected intermediate center frequency;
         frequency shifting the IF signal based on the frequency drift; and
         allocating a plurality of channel bandwidths to a corresponding plurality of frequency translation modules based at least on the IF signal bandwidth and an operating bandwidth of a client device.

2. The system of claim 1, wherein the LNB comprises a dielectric resonator oscillator (DRO) and wherein the local oscillator tone is provided by the DRO.

3. The system of claim 1, wherein the LNB comprises a phase-locked loop (PLL) and wherein the local oscillator tone is provided by the PLL.

4. The system of claim 1, wherein the determining of the intermediate center frequency of the IF signal further comprises accessing an intermediate center frequency look-up table, wherein the intermediate center frequency look-up table comprises an entry comprising the expected intermediate center frequency.

5. The system of claim 1, wherein the operations further comprise:
   transmitting a tuning query via a bi-directional communication link, wherein the SWM device comprises a frequency translator including a frequency translation module;
   receiving a tuning request from the client device via the bi-directional communication link, wherein the tuning request comprises a requested transponder signal and an expected bandwidth of the requested transponder signal;
   causing a multiswitch of the SWM device to connect the IF signal to the frequency translator based on the tuning request;
   causing the frequency translator to convert to the requested transponder signal to an SWM channel; and
   adjusting a bandwidth of the SWM channel based on the expected bandwidth of the requested transponder signal, wherein the expected bandwidth of the requested transponder signal is less than the IF signal bandwidth.

6. The system of claim 5, wherein the requested transponder signal comprises one of a type provided by a Ku-band transponder and wherein the expected bandwidth of the requested transponder signal is between 22 MHz and 26 MHz.

7. The system of claim 5, wherein the requested transponder signal comprises one of a type provided by a Ka-band type transponder and wherein the expected bandwidth of the requested transponder signal is between 34 MHz and 38 MHz.

8. A method comprising:
   receiving, by a low-noise block down-converter (LNB), a signal comprising a first carrier frequency, wherein the LNB comprises a local oscillator and a frequency mixer,
   converting the signal to an intermediate frequency (IF) signal using the frequency mixer by combining the signal and a local oscillator tone, wherein the IF signal comprises an IF signal bandwidth;
   determining, by a processing system of a single-wire multiswitch (SWM) device that includes a controller and a DSP, an intermediate center frequency of the IF signal, wherein the SWM device is communicatively coupled to the LNB;
   determining, by the processing system, a frequency drift based on a comparison between the intermediate center frequency and an expected intermediate center frequency;
   facilitating by the processing system, a frequency shift of the IF signal based on the frequency drift; and
   facilitating, by the processing system, allocation of a plurality of channel bandwidths to a corresponding plurality of frequency translation modules based at least on the IF signal bandwidth and an operating bandwidth of a client device.

9. The method of claim 8, wherein the LNB comprises a dielectric resonator oscillator (DRO) and wherein the local oscillator tone is provided by the DRO.

10. The method of claim 8, wherein the LNB comprises a phase-locked loop (PLL) and wherein the local oscillator tone is provided by the PLL.

11. The method of claim 8, wherein the determining of the IF signal comprises using an intermediate center frequency look-up table, wherein the intermediate center frequency look-up table comprises an entry comprising the expected intermediate center frequency.

12. The method of claim 8, further comprising:
   facilitating, by the processing system, transmission of a tuning query via a bi-directional communication link, wherein the SWM device comprises a frequency translator that includes a frequency translation module;
   detecting, by the processing system, a tuning request received from the client device via the bi-directional communication link, wherein the tuning request comprises a requested transponder signal and an expected bandwidth of the requested transponder signal;
   facilitating, by the processing system, operation of a multiswitch of the SWM device to connect the IF signal to the frequency translator based on the tuning request;
   facilitating, by the processing system, operation of the frequency translator to convert to the requested transponder signal to a SWM channel; and
   adjusting, by the processing system, a bandwidth of the SWM channel based on the expected bandwidth of the requested transponder signal, wherein the expected bandwidth of the requested transponder signal is less than the IF signal bandwidth.

13. The method of claim 12, wherein the requested transponder signal comprises one of a type provided by a Ku-band transponder and wherein the expected bandwidth of the requested transponder signal is between 22 MHz and 26 MHz.

14. The method of claim 12, wherein the requested transponder signal comprises one of a type provided by a Ka-band type transponder and wherein the expected bandwidth of the requested transponder signal is between 34 MHz and 38 MHz.

15. A non-transitory machine-readable storage medium, comprising executable instructions that, when executed by a processing system of a single-wire multiswitch (SWM) device including a processor, facilitate performance of operations, comprising:
   receiving an intermediate frequency (IF) signal obtained from a low-noise block down-converter (LNB) comprising a local oscillator and a frequency mixer, wherein the IF signal comprises an IF signal bandwidth and is obtained by combining a first carrier signal and a local oscillator tone within the frequency mixer;
   determining, within the SWM device, an intermediate center frequency of the IF signal;
   determining, within the SWM device, a frequency drift based on a comparison between the intermediate center frequency and an expected intermediate center frequency;
   frequency shifting the IF signal based on the frequency drift; and
   allocating a plurality of channel bandwidths to a corresponding plurality of frequency translation modules based at least on the IF signal bandwidth and an operating bandwidth of a client device.

16. The non-transitory machine-readable storage medium of claim 15, wherein the LNB comprises a dielectric resonator oscillator (DRO) and wherein the local oscillator tone is provided by the DRO.

17. The non-transitory machine-readable storage medium of claim 15, wherein the LNB comprises a phase-locked loop (PLL) and wherein the local oscillator tone is provided by the PLL.

18. The non-transitory machine-readable storage medium of claim 15, wherein the SWM device comprises an intermediate center frequency look-up table, wherein the intermediate center frequency look-up table comprises an entry comprising the expected intermediate center frequency.

19. The non-transitory machine-readable storage medium of claim 15, wherein the operations further comprise:
transmitting a tuning query via a bi-directional communication link, wherein the SWM device comprises a frequency translator including a frequency translation module;
receiving, by the SWM device, a tuning request from the client device via the bi-directional communication link, wherein the tuning request comprises a requested transponder signal and an expected bandwidth of the requested transponder signal;
facilitating operation of a multiswitch of the SWM device to connect the IF signal to the frequency translator based on the tuning request;
facilitating operation of the frequency translator to convert to the requested transponder signal to a SWM channel; and
adjusting a bandwidth of the SWM channel based on the expected bandwidth of the requested transponder signal, wherein the expected bandwidth of the requested transponder signal is less than the IF signal bandwidth.

20. The non-transitory machine-readable storage medium of claim 19, wherein the requested transponder signal comprises one of a type provided by a Ku-band transponder and wherein the expected bandwidth of the requested transponder signal is between 22 MHz and 26 MHz.

* * * * *